(12) United States Patent
Li et al.

(10) Patent No.: US 11,319,241 B2
(45) Date of Patent: May 3, 2022

(54) COMPOSITION FOR PREPARING GLASS, GLASS ARTICLE AND USE THEREOF

(71) Applicant: TUNGHSU GROUP CO., LTD., Hebei (CN)

(72) Inventors: Debao Li, Shijiazhuang (CN); Qing Li, Shijiazhuang (CN); Guangtao Zhang, Shijiazhuang (CN); Zhonghua Wang, Shijiazhuang (CN); Feng Guo, Shijiazhuang (CN); Dongcheng Yan, Shijiazhuang (CN)

(73) Assignee: TUNGHSU GROUP CO., LTD., Shijiazhuang (CN)

(*) Notice: Subject to any disclaimer, the term of this patent is extended or adjusted under 35 U.S.C. 154(b) by 55 days.

(21) Appl. No.: 16/474,200

(22) PCT Filed: Nov. 10, 2017

(86) PCT No.: PCT/CN2017/110345
§ 371 (c)(1),
(2) Date: Jun. 27, 2019

(87) PCT Pub. No.: WO2018/121097
PCT Pub. Date: Jul. 5, 2018

(65) Prior Publication Data
US 2019/0352218 A1  Nov. 21, 2019

(30) Foreign Application Priority Data

Dec. 30, 2016 (CN) .......................... 201611271141.2

(51) Int. Cl.
*C03C 3/091* (2006.01)
*C03B 5/18* (2006.01)

(52) U.S. Cl.
CPC .............. *C03C 3/091* (2013.01); *C03B 5/18* (2013.01)

(58) Field of Classification Search
CPC ......... C03C 3/087; C03C 3/088; C03C 3/089; C03C 3/09; C03C 3/091
See application file for complete search history.

(56) References Cited

U.S. PATENT DOCUMENTS

| | | | |
|---|---|---|---|
| 5,851,939 A | 12/1998 | Miwa | |
| 6,465,381 B1* | 10/2002 | Lautenschlager | C03C 3/091 501/67 |
| 2009/0133441 A1 | 5/2009 | Ellison | |
| 2012/0141668 A1 | 6/2012 | Nakashima | |
| 2014/0342897 A1 | 11/2014 | Amin et al. | |
| 2016/0090321 A1* | 3/2016 | Bookbinder | C03C 3/093 428/220 |

FOREIGN PATENT DOCUMENTS

| | | | | |
|---|---|---|---|---|
| CN | 1303829 A | 7/2001 | | |
| CN | 1807308 * | 7/2006 | ............. | C03C 3/095 |
| CN | 101012104 * | 8/2007 | ............. | C03C 3/11 |
| CN | 101565266 A | 10/2009 | | |
| CN | 101626988 A | 1/2010 | | |
| CN | 102690056 A | 9/2012 | | |
| CN | 105121370 A | 12/2015 | | |
| CN | 105645762 A | 6/2016 | | |
| CN | 105916821 A | 8/2016 | | |
| CN | 106746601 A | 5/2017 | | |
| DE | 102015113041 A1 | 6/2016 | | |
| JP | 9-110460 A | 4/1997 | | |
| JP | 10-72237 A | 3/1998 | | |
| JP | 2001-220173 A | 8/2001 | | |
| JP | 2004-189535 A | 7/2004 | | |
| JP | 2006-347795 A | 12/2006 | | |
| JP | 2009-545512 A | 12/2009 | | |
| JP | 2010-509190 A | 3/2010 | | |
| JP | 2012-254926 A | 12/2012 | | |
| JP | 2013-107801 A | 6/2013 | | |
| JP | 2014-240332 A | 12/2014 | | |
| JP | 2015-178440 A | 10/2015 | | |
| JP | 2016-113363 A | 6/2016 | | |
| JP | 6562240 B2 * | 8/2019 | ............. | C03C 3/093 |
| WO | 2008/018996 A2 | 2/2008 | | |

(Continued)

OTHER PUBLICATIONS

WO-2015129495-A1—English language machine translation via EspaceNet Takaya Tatsuya (Year: 2015).*
WO2015080171 machine translation via EspaceNet (Year: 2015).*
JP6562240 machine translation via EspaceNet (Year: 2015).*
International Search Report and Written Opinion for Application No. PCT/CN2017/110345, dated Feb. 6, 2018, 11 pages.
Japanese Office Action for Application No. 2019-556401, dated May 18, 2021, 9 pages.

*Primary Examiner* — Karl E Group
*Assistant Examiner* — Cameron K Miller
(74) *Attorney, Agent, or Firm* — McCarter & English, LLP; Wei Song; Christopher D. Bayne

(57) ABSTRACT

The invention discloses a composition for preparing glass, a glass article and a use thereof, and a glass article made from the composition. The glass article is preferably a glass substrate made from a composition with an M value of from about 1 to about 10 as calculated by the empirical equation: $M=0.13 \times wt~(B_2O_3) \times wt~(B_2O_3) + 0.42 \times wt~(CaO) + 0.55 \times wt~(MgO) + 0.75 \times wt~(SrO) - 0.05 \times wt~(Al_2O_3) \times wt~(Al_2O_3)$. A use of the glass article (especially the glass substrate) for manufacturing a display device is disclosed herein, wherein the glass article has better properties, such as lowered content of solid inclusions and gas inclusions, lowered thickness range and lowered warpage.

31 Claims, No Drawings

(56) References Cited

FOREIGN PATENT DOCUMENTS

| WO | 2012/118722 A2 | 9/2012 | | |
|----|----|----|----|----|
| WO | WO-2015080171 A1 | * | 6/2015 | ............ C03C 3/091 |
| WO | WO-2015129495 A1 | * | 9/2015 | ............ C03C 1/00 |
| WO | 2016/053775 A1 | 4/2016 | | |
| WO | 2016/094282 A1 | 6/2016 | | |

* cited by examiner

COMPOSITION FOR PREPARING GLASS, GLASS ARTICLE AND USE THEREOF

CROSS-REFERENCE TO RELATED APPLICATIONS

This application is a U.S. national stage filing, under 35 U.S.C. § 371(c), of International Application No. PCT/CN2017/110345, filed on Nov. 10, 2017, which claims priority to Chinese Patent Application No. 201611271141.2, filed on Dec. 30, 2016. The entire contents of each of the aforementioned applications are incorporated herein by reference.

TECHNICAL FIELD

The present invention generally relates to a composition for preparing glass, a glass article and a use thereof. In particular, the present invention relates to a glass substrate article, particularly a glass substrate for use in a display device.

BACKGROUND OF THE INVENTION

Many display devices (e.g., display screens, televisions, touch screens, flat panel display devices such as flat panel displays, portable display devices, communication devices such as cell phones, etc.) comprise a glass substrate.

Methods for manufacturing a glass substrate include an overflow down-draw method, a slot down-draw method, a redrawing method, a float method, and the like (see U.S. Pat. Nos. 3,338,696, 3,682,609, etc.). These methods generally include the steps of: preparing glass raw materials into a clear glass melt by a process comprising melting; homogenizing the glass melt; and molding the homogenized glass melt into a glass substrate. Generally, a small amount of solid inclusions (for example, $SiO_2$ particles, siliceous crystals, wollastonite, etc.) and gas inclusions (for example, $CO_2$, $O_2$, $N_2$, $H_2O$, $SO_2$, CO, etc.) may be present in the glass substrate. Moreover, the glass substrate may have a certain degree of thickness range and warpage. For glass substrates (especially for glass substrates used in display devices), solid inclusions, gas inclusions, thickness range, and warpage are all undesired factors.

In order to reduce or eliminate these undesired factors, those skilled in the art typically employ methods comprising the steps of adjusting and controlling the conditions and operating parameters of the glass-molding process. For example, CN1878731A discloses a method of forming glass with substantially reduced inclusions and stripes. JP2004-91307 and JP H11-349335 disclose methods of defoaming by means of adding a clarifying agent, stirring, foaming, or the like. CN101437764A also discloses a method of removing bubbles remaining on the surface of a glass. CN105217935A discloses a device and a method for preventing a glass plate from warping. CN103359913A discloses a method of reducing warpage and deformation of a glass substrate.

However, the glass substrates produced by the above methods are still unsatisfactory. Additionally, a variety of display devices put forward increasingly high requirements on the quality of the glass substrate.

Accordingly, there is still a continuous need for a glass substrate with improved properties, such as low content of solid inclusions and gas inclusions, low thickness range and/or low warpage.

SUMMARY OF THE INVENTION

The present inventors have found that by means of controlling the types and contents of components in the composition for preparing a glass and/or in the glass to satisfy a specific matching relationship, not only the content of solid inclusions and gas inclusions in the obtained glass substrate can be significantly lowered, but also the thickness range and the warpage can be significantly lowered.

In some aspects, the present invention relates to a composition comprising $SiO_2$, $Al_2O_3$, $B_2O_3$, CaO, MgO and SrO for preparing a glass article, wherein:

relative to about 100 parts by weight of $SiO_2$, the content of $Al_2O_3$ is from about 20 to about 35 parts by weight, the content of $B_2O_3$ is from about 10 to about 22 parts by weight, the content of CaO is from about 4 to about 17 parts by weight, the content of MgO is from about 0 to about 10 parts by weight, and the content of SrO is from about 0.8 to about 14 parts by weight; and the composition has an M value of from about 1 to about 10 as calculated by the following empirical equation (I):

$$M = 0.13 \times wt(B_2O_3) \times wt(B_2O_3) + 0.42 \times wt(CaO) + 0.55 \times wt(MgO) + 0.75 \times wt(SrO) - 0.05 \times wt(Al_2O_3) \times wt(Al_2O_3) \quad \text{Equation (I)}$$

wherein wt ($B_2O_3$) represents parts by weight of $B_2O_3$ relative to about 100 parts by weight of $SiO_2$, wt (CaO) represents parts by weight of CaO relative to about 100 parts by weight of $SiO_2$, wt (MgO) represents parts by weight of MgO relative to about 100 parts by weight of $SiO_2$, wt (SrO) represents parts by weight of SrO relative to about 100 parts by weight of $SiO_2$, and wt ($Al_2O_3$) represents parts by weight of $Al_2O_3$ relative to about 100 parts by weight of $SiO_2$.

In some aspects, the present invention also provides a glass article, preferably a glass substrate, manufactured from the composition of the present invention.

In other aspects, the present invention relates to a glass article comprising $SiO_2$, $Al_2O_3$, $B_2O_3$, CaO, MgO and SrO, wherein:

relative to about 100 parts by weight of $SiO_2$, the content of $Al_2O_3$ is from about 20 to about 35 parts by weight, the content of $B_2O_3$ is from about 10 to about 22 parts by weight, the content of CaO is from about 4 to about 17 parts by weight, the content of MgO is from about 0 to about 10 parts by weight, and the content of SrO is from about 0.8 to about 14 parts by weight; and the glass article has an M value of from about 1 to about 10 as calculated by the following empirical equation (I):

$$M = 0.13 \times wt(B_2O_3) \times wt(B_2O_3) + 0.42 \times wt(CaO) + 0.55 \times wt(MgO) + 0.75 \times wt(SrO) - 0.05 \times wt(Al_2O_3) \times wt(Al_2O_3) \quad \text{Equation (I)}$$

wherein wt ($B_2O_3$) represents parts by weight of $B_2O_3$ relative to about 100 parts by weight of $SiO_2$, wt (CaO) represents parts by weight of CaO relative to about 100 parts by weight of $SiO_2$, wt (MgO) represents parts by weight of MgO relative to about 100 parts by weight of $SiO_2$, wt (SrO) represents parts by weight of SrO relative to about 100 parts by weight of $SiO_2$, and wt ($Al_2O_3$) represents parts by weight of $Al_2O_3$ relative to about 100 parts by weight of $SiO_2$. Preferably, the glass article is a glass substrate.

In some preferred aspects, the glass substrate of the present invention has a K value of less than or equal to about 7.0 as calculated by the empirical equation (II) below, $$K=1.5'(X/Y)-1.8\times D+0.22\times H+1.8\times N \quad \text{Equation (II)}$$

wherein X/Y represents the length-width ratio of the glass substrate having a value of 1.02 to 1.24, D represents a numerical value of the thickness of the glass substrate in millimeters (mm), H represents a numerical value of the thickness range of the glass substrate in micrometers (μm), and N represents a value indicating the total number of solid inclusions and gas inclusions expressed in number per kilogram (Kg) of the glass substrate.

In the art, the thickness (D) of the glass substrate is usually 0.2-0.7 mm. The thickness range (H) of the glass substrate is preferably ≤22 μm, more preferably ≤20 μm, and further preferably ≤18 μm. The total number of solid inclusions and gas inclusions in the glass substrate is preferably ≤0.5/Kg, more preferably ≤0.4/Kg, and further preferably ≤0.3/Kg.

In still other aspects, the glass article of the present invention is manufactured by a method comprising the steps of:

1) preparing the components in the form of raw materials into a clear glass melt by a process comprising melting;
2) homogenizing the clear glass melt; and
3) cooling and molding the homogenized clear glass melt, wherein either or both of step 1) and step 2) comprise sonication. In a further embodiment, one or more rods are inserted into the glass melt during the sonication.

In still other aspects, the present invention provides a display device comprising the glass article (especially the glass substrate) as described herein.

The present invention further provides use of the glass article (especially the glass substrate) for manufacturing a display device.

Under the same preparation process, the composition and the glass article (especially the glass substrate) having an M value of from about 1 to about 10, preferably from about 3 to about 8, and further preferably from about 5 to about 7, as calculated by the empirical equation (I) as described in the present invention have lowered content of solid inclusions and gas inclusions, lowered thickness range and lowered warpage. Through sonication, and preferably sonication with insertion of one or more rods into the glass melt during the process, not only the content of solid inclusions and gas inclusions in the resulting glass substrate can be significantly lowered, but also the thickness range and the warpage can be significantly lowered. The glass article (especially the glass substrate) having a K value of less than or equal to about 7.0, preferably less than or equal to about 6.5, further preferably less than or equal to about 6.0, and most preferably less than or equal to about 5.5, as calculated by the empirical equation (II) as described in the present invention has better properties, for example, lowered coating defects, improved displaying effects and increased facture toughness. Accordingly, the display device comprising the glass article (especially the glass substrate) of the present invention has better properties, for example, a better yield.

DETAILED DESCRIPTION OF THE INVENTION

The inventors have found that both the types and contents of various components in a glass article can affect the content of solid inclusions and gas inclusions, the thickness range and the warpage of the glass substrate.

Specifically, it is found that under the same preparation process, the glass article having an M value of from about 1 to about 10, preferably from about 3 to about 8, and further preferably from about 5 to about 7, as calculated by the empirical equation (I) as described in the present invention has lowered content of solid inclusions and gas inclusions, lowered thickness range and lowered warpage. The M value will not be affected by various process parameters and/or the presence of other optional components in the glass manufacturing process. Under the premise that the preparation process is ensured to be the same in the glass manufacturing process using various process parameters and/or other optional components, the glass article having the M value has lowered content of solid inclusions and gas inclusions, lowered thickness range and lowered warpage.

Preferably, the glass article of the present invention is a glass substrate.

Further, the glass article (especially the glass substrate) having a K value of less than or equal to about 7.0 as calculated by the empirical equation (II) as described in the present invention has better properties, for example, lowered coating defects, improved displaying effects and increased facture toughness.

In a still further embodiment, by introducing sonication into step 1): forming the clear glass melt and/or step 2): homogenizing the clear glass melt of the manufacturing method, the components in the resulting glass melt are dispersed more evenly, so that the number of solid inclusions and gas inclusions in the molded glass substrate is further lowered, and the thickness range and the warpage are further lowered. The sonication can be carried out one or more times. When multiple sonications are carried out, there should be a time interval between each sonication to allow for floatation and adsorption of the bubbles.

In a yet further embodiment, one or more rods are inserted into the glass melt during the sonication. As compared to the absence of rods, the insertion of rods into the glass melt during the sonication facilitates the formation of more microcirculation spaces in the glass melt-holding container, thereby increasing the respective collision probability of solid inclusions and/or gas inclusions. The insertion of rods into the glass melt during the sonication facilitates the decrease in the size of solid inclusions and/or gas inclusions in the glass melt, and is also beneficial to the upward floating of solid inclusions and/or gas inclusions outside the glass melt. Therefore, the insertion of rods into the glass melt during the sonication facilitates the decrease in the number of solid inclusions and gas inclusions in the glass article.

In some aspects, the present invention relates to a composition comprising $SiO_2$, $Al_2O_3$, $B_2O_3$, CaO, MgO and SrO for preparing a glass article, wherein:

relative to about 100 parts by weight of $SiO_2$, the content of $Al_2O_3$ is from about 20 to about 35 parts by weight, the content of $B_2O_3$ is from about 10 to about 22 parts by weight, the content of CaO is from about 4 to about 17 parts by weight, the content of MgO is from about 0 to about 10 parts by weight, and the content of SrO is from about 0.8 to about 14 parts by weight; and the composition has an M value of from about 1 to about 10 as calculated by the following empirical equation (I):

$$M=0.13\times wt(B_2O_3)\times wt(B_2O_3)+0.42\times wt(CaO)+0.55\times wt(MgO)+0.75\times wt(SrO)-0.05\times wt(Al_2O_3)\times wt(Al_2O_3) \quad \text{Equation (I)}$$

wherein wt ($B_2O_3$) represents parts by weight of $B_2O_3$ relative to about 100 parts by weight of $SiO_2$,
wt (CaO) represents parts by weight of CaO relative to about 100 parts by weight of $SiO_2$,
wt (MgO) represents parts by weight of MgO relative to about 100 parts by weight of $SiO_2$,
wt (SrO) represents parts by weight of SrO relative to about 100 parts by weight of $SiO_2$, and
wt ($Al_2O_3$) represents parts by weight of $Al_2O_3$ relative to about 100 parts by weight of $SiO_2$.

In some aspects, the present invention also provides a glass article, preferably a glass substrate, manufactured from the composition of the present invention.

In other aspects, the present invention relates to a glass article comprising $SiO_2$, $Al_2O_3$, $B_2O_3$, CaO, MgO and SrO, wherein:
relative to about 100 parts by weight of $SiO_2$, the content of $Al_2O_3$ is from about 20 to about 35 parts by weight, the content of $B_2O_3$ is from about 10 to about 22 parts by weight, the content of CaO is from about 4 to about 17 parts by weight, the content of MgO is from about 0 to about 10 parts by weight, and the content of SrO is from about 0.8 to about 14 parts by weight; and
the glass article has an M value of from about 1 to about 10 as calculated by the following empirical equation (I):

$$M = 0.13 \times wt(B_2O_3) \times wt(B_2O_3) + 0.42 \times wt(CaO) + 0.55 \times wt(MgO) + 0.75 \times wt(SrO) - 0.05 \times wt(Al_2O_3) \times wt(Al_2O_3) \quad \text{Equation (I)}$$

wherein wt ($B_2O_3$) represents parts by weight of $B_2O_3$ relative to about 100 parts by weight of $SiO_2$,
wt (CaO) represents parts by weight of CaO relative to about 100 parts by weight of $SiO_2$,
wt (MgO) represents parts by weight of MgO relative to about 100 parts by weight of $SiO_2$,
wt (SrO) represents parts by weight of SrO relative to about 100 parts by weight of $SiO_2$, and
wt ($Al_2O_3$) represents parts by weight of $Al_2O_3$ relative to about 100 parts by weight of $SiO_2$. Preferably, the glass article is a glass substrate.

In some preferred aspects, the glass substrate of the present invention has a K value of less than or equal to about 7.0 as calculated by the empirical equation (II) below, $$K = 1.5 \times (X/Y) - 1.8 \times D + 0.22 \times H + 1.8 \times N \quad \text{Equation (II)}$$

wherein X/Y represents the length-width ratio of the glass substrate having a value of 1.02 to 1.24, D represents a numerical value of the thickness of the glass substrate in millimeters (mm), H represents a numerical value of the thickness range of the glass substrate in micrometers ($\mu m$), and N represents a value indicating the total number of solid inclusions and gas inclusions expressed in number per kilogram (Kg) of the glass substrate.

In the art, the thickness (D) of the glass substrate is usually 0.2-0.7 mm. The thickness range (H) of the glass substrate is preferably $\leq 22$ $\mu m$, more preferably $\leq 20$ $\mu m$, and further preferably $\leq 18$ $\mu m$. The total number of solid inclusions and gas inclusions in the glass substrate is preferably $\leq 0.5$/Kg, more preferably $\leq 0.4$/Kg, and further preferably $\leq 0.3$/Kg.

In still other aspects, the glass article of the present invention is manufactured by a method comprising the steps of:
1) preparing the components in the form of raw materials into a clear glass melt by a process comprising melting;
2) homogenizing the clear glass melt; and
3) cooling and molding the homogenized clear glass melt, wherein either or both of step 1) and step 2) comprise sonication. In a further embodiment, one or more rods are inserted into the glass melt during the sonication.

In some embodiments, the content of $Al_2O_3$ is from about 25 to about 30 parts by weight, relative to about 100 parts by weight of $SiO_2$. In some embodiments, the content of $B_2O_3$ is from about 15 to about 18 parts by weight, relative to about 100 parts by weight of $SiO_2$. In some embodiments, the content of CaO is from about 10 to about 14 parts by weight, relative to about 100 parts by weight of $SiO_2$. In some embodiments, the content of MgO is from about 1 to about 5 parts by weight, preferably from about 1.8 to about 3 parts by weight, relative to about 100 parts by weight of $SiO_2$. In some embodiments, the content of SrO is from about 1.1 to about 1.5 parts by weight, relative to about 100 parts by weight of $SiO_2$.

In some embodiments, the composition for preparing a glass article and/or the glass article according to the present invention further comprises $SnO_2$. In further embodiments, the content of $SnO_2$ is from about 0.1 to about 0.8 parts by weight, relative to about 100 parts by weight of $SiO_2$. In further preferred embodiments, the content of $SnO_2$ is from about 0.2 to about 0.7 parts by weight, relative to about 100 parts by weight of $SiO_2$.

In some embodiments, the composition for preparing a glass article and/or the glass article according to the present invention further comprises BaO. In further embodiments, the content of BaO is from about 0 to about 4 parts by weight, relative to about 100 parts by weight of $SiO_2$. In further preferred embodiments, the content of BaO is from about 0.5 to about 3 parts by weight, relative to about 100 parts by weight of $SiO_2$.

In some embodiments, the M value as described in the present invention is preferably from about 3 to about 8, and more preferably from about 5 to about 7.

In some embodiments, the K value as described in the present invention is preferably less than or equal to 6.5, more preferably less than or equal to about 6.0, and most preferably less than or equal to about 5.5.

In some embodiments, the sonication is carried out using an ultrasonic wave having an average acoustic energy density of from about 50 to about 60 W/L. In some embodiments, the sonication is carried out using an ultrasonic wave having an ultrasonic frequency of from about 25 to about 40 kHz.

In some embodiments, the sonication is carried out at a temperature of from about 1000 to about 1500° C., preferably from about 1100 to about 1400° C., and more preferably from about 1200 to about 1300° C.

In some embodiments, the duration of each of the sonications is independently from about 3 to about 60 minutes, preferably from about 5 to about 50 minutes, more preferably from about 10 to about 40 minutes, and most preferably from about 15 to about 30 minutes.

When multiple sonications are used, the time interval between each of the sonications is independently from 1 to 20 minutes, preferably from 2 to 15 minutes, and further preferably from 5 to 10 minutes.

In some embodiments, the rod is a cylinder and/or a prism (e.g., a triangular prism, a quadrangular prism, a pentagonal prism, a hexagonal prism, and/or an octagonal prism). In some embodiments, the diameter or nominal diameter of the rod is from about 10 to about 30 millimeters. In further embodiments, the diameter or nominal diameter of the cylinder or the diameter or nominal diameter of the circumscribed circle of the prism is from about 10 to about 30 millimeters.

In some embodiments, the rod is made from an inert material not imparting impurities to the glass melt. In further embodiments, the rod is made from a material comprising Pt and/or Rh.

When a plurality of rods are used, the spacing between each of the rods is not particularly limited. The spacing between each of the rods may or may not be equal. For example, the spacing between each of the rods is independently from about 10 to about 50 mm. In some embodiments, the plurality of rods are arranged in an array.

The solid inclusions as described herein include particulate solids. The gas inclusions as described herein include air bubbles.

The term "thickness range" as described herein refers to the difference between the maximum thickness value and the minimum thickness value in micrometers (μm) at a specific original sheet size (for example, 1100×1250 mm). In the art, the thickness of the glass substrate is generally from 0.2 to 0.7 mm.

The term "warpage" as described herein refers to the warping degree as measured according to the following warpage testing procedure:
1) providing a warpage measuring instrument with a marble horizontal platform, above which there is an imaginary reference horizontal plane;
2) selecting a plurality of fixed positions on the marble horizontal platform, and measuring the height of the imaginary reference horizontal plane from the marble horizontal platform at the fixed positions, which is recorded as H1;
3) placing a whole sheet of a glass substrate on the marble horizontal platform, and measuring the height of the upper surface of the glass substrate from the imaginary reference horizontal plane at the fixed positions, which is recorded as H2;
4) adding H1 to H2 to obtain the actual height at the fixed positions; and
5) subtracting the minimum value from the maximum value of the actual height at the fixed positions (i.e., range) to obtain the warpage in millimeters (mm),
wherein the imaginary reference horizontal plane is provided to correct the marble horizontal platform, and H2 should be greater than H1.

In some embodiments, the warpage of the obtained glass substrate can be less than or equal to about 0.05 mm by using the glass components as defined in the present invention. In some embodiments, the warpage of the obtained glass substrate can be less than or equal to about 0.04 mm by using the method of preparation comprising sonication. In some embodiments, the warpage of the obtained glass substrate can be less than or equal to about 0.03 mm, preferably 0.02 mm, by using the method of preparation comprising sonication and insertion of rods.

The terms "glass substrate" and "glass plate" are used interchangeably herein.

In some embodiments, the method of the present invention optionally further employs a means known in the art for controlling particle size, controlling particle shape, reducing the content of refractory impurities, and/or thin layer charging.

In some embodiments, the method for preparing the glass article of the present invention is an overflow down-draw method, a slot down-draw method, a redrawing method or a float method comprising the steps 1)-3).

In some embodiments, the total number of solid inclusions and gas inclusions in the glass substrate of the present invention is less than or equal to about 0.25/Kg of glass, preferably less than or equal to about 0.22/Kg of glass, and further preferably less than or equal to about 0.18/Kg of glass.

In some embodiments, the total number of gas inclusions in the glass substrate of the present invention is less than or equal to about 0.23/Kg of glass, preferably less than or equal to about 0.21/Kg of glass, more preferably less than or equal to about 0.20/Kg of glass, further preferably less than or equal to about 0.18/Kg of glass, and still further preferably less than or equal to about 0.16/Kg of glass.

In some embodiments, the total number of solid inclusions in the glass substrate of the present invention is less than or equal to about 0.02/Kg of glass, preferably less than or equal to about 0.01/Kg of glass.

The term "about" as used herein with respect to a numerical value means plus or minus no more than 10%, preferably no more than 5%, more preferably no more than 2%, further preferably no more than 1% of the numerical value, and most preferably refers to the numerical value per se. For example, about 100 parts by weight of $SiO_2$ refers to 100±10 parts by weight, preferably 100±5 parts by weight, more preferably 100±2 parts by weight, further preferably 100±1 parts by weight, and most preferably 100 parts by weight of $SiO_2$.

The length-width ratio of the glass substrate represented by X/Y in the present invention refers the ratio of the length to the width of the glass substrate. For glass substrates which do not have the length-width ratio value as described in the present invention, they may be first cut into a glass substrate having the length-width ratio value as described herein, and then the K value may be calculated.

The length, width, thickness, and thickness range of the glass substrate, the number of solid inclusions and bubbles per Kg of glass, and the warpage of the glass substrate are measured by a measuring method commonly used in the art. For example, the length and the width are measured by a micrometer and/or a caliper; the thickness is measured by a micrometer and/or an image measuring instrument; the number of solid inclusions and/or gas inclusions is measured by a surface inspection machine or by a method such as manual sampling; and the warpage is measured by a feeler gauge or a warpage measuring instrument (such as by laser ranging).

The present invention also provides a display device, comprising the glass article (especially the glass substrate) as described herein. Preferably, the display device is a display screen, a television, a touch screen, a flat panel display device such as a flat panel display, a portable display device, and a communication device such as a cell phone.

The present invention further provides use of the glass article (especially the glass substrate) for manufacturing a display device.

Under the same preparation process, the composition and the glass article (especially the glass substrate) having an M value of from about 1 to about 10, preferably from about 3 to about 8, and further preferably from about 5 to about 7, as calculated by the empirical equation (I) as described in the present invention have lowered content of solid inclusions and gas inclusions, lowered thickness range and lowered warpage. The glass article (especially the glass substrate) having a K value of less than or equal to about 7.0, preferably less than or equal to about 6.5, further preferably less than or equal to about 6.0, and most preferably less than or equal to about 5.5, as calculated by the empirical equation (II) as described in the present invention has better properties, for example, lowered coating defects, improved displaying effects and increased facture toughness. Accordingly, the display device comprising the glass article (especially the glass substrate) of the present invention has better properties, for example, a better yield.

EXAMPLES

The beneficial effects of the present invention will be demonstrated by ways of examples below. Those skilled in the art will recognize that these examples are merely illustrative and not restrictive. These examples are not intended to limit the scope of the present invention in any manner. The experimental methods as described in the following examples are conventional methods unless otherwise specified; and the reagents and materials are commercially available unless otherwise specified.

General Method for Preparing Glass Article

1) A predetermined amount of components in the form of raw materials were mixed to give a mixture. The mixture was heated to a temperature between about 1400 and about 1600° C. to give a clear glass melt. Then, sonication (if any) was performed, and rods arranged in an array (if any) were inserted into the glass melt during the sonication. The glass melt was set aside for 20 minutes.

2) The clear glass melt was homogenized by stirring. Then, sonication (if any) was performed, and rods arranged in an array (if any) were inserted into the glass melt during the sonication. The glass melt was set aside for 20 minutes.

3) The homogenized clear glass melt was prepared into a glass substrate by the overflow down-draw method. Then, the glass substrate was annealed and cut into a desired size.

The number of solid inclusions and gas inclusions, the thickness range, and the warpage of the resulting glass substrate were measured.

The components $SiO_2$, $Al_2O_3$, $B_2O_3$, CaO, MgO, SrO, $SnO_2$ and BaO as described in the examples are all commercially available. The number of solid inclusions and gas inclusions as described in the examples was measured by a Schenck surface inspection machine. The thickness range as described in the examples was measured by an SWT measuring instrument. The warpage as described in the examples was measured by an EXCEL warpage measuring instrument.

Examples 1-7 and Comparative Examples 1-5: effects of various components and their contents in glass on relevant properties

TABLE 1

|  | Example 1 | Example 2 | Example 3 | Example 4 | Example 5 | Example 6 |
|---|---|---|---|---|---|---|
| $SiO_2$ | 100.00 | 100.00 | 100.00 | 100.00 | 100.00 | 100.00 |
| $Al_2O_3$ | 28.00 | 26.00 | 27.00 | 22.00 | 33.00 | 33.00 |
| $B_2O_3$ | 17.00 | 15.00 | 16.00 | 14.00 | 20.00 | 20.00 |
| CaO | 12.00 | 9.00 | 18.00 | 6.00 | 15.00 | 15.00 |
| MgO | 2.00 | 4.00 | 2.00 | 5.00 | 3.00 | 3.00 |
| SrO | 1.30 | 1.50 | 0.90 | 1.50 | 0.80 | 0.80 |
| $SnO_2$ | — | 0.50 | 0.70 | 0.30 | 0.60 | 0.60 |
| BaO | — | — | — | — | 1.63 | — |
| Melting temperature (□) | 1400 | 1450 | 1500 | 1550 | 1600 | 1400 |
| M value | 5.49 | 2.56 | 6.17 | 7.68 | 6.10 | 6.10 |
| Glass substrate thickness D (mm) | 0.35 | 0.45 | 0.50 | 0.35 | 0.30 | 0.26 |
| Glass substrate thickness range H (μm) | 14.00 | 15.00 | 13.00 | 15.00 | 16.00 | 22.00 |
| Number of solid inclusions and gas inclusions N (per Kg of glass) | 0.17 | 0.18 | 0.23 | 0.24 | 0.24 | 0.43 |
| Warpage (mm) | 0.012 | 0.010 | 0.015 | 0.024 | 0.027 | 0.028 |

|  | Example 7 | Comparative Example 1 | Comparative Example 2 | Comparative Example 3 | Comparative Example 4 | Comparative Example 5 |
|---|---|---|---|---|---|---|
| $SiO_2$ | 100.00 | 100.00 | 100.00 | 100.00 | 100.00 | 100.00 |
| $Al_2O_3$ | 30.00 | 40.00 | 26.00 | 27.00 | 24.00 | 33.00 |
| $B_2O_3$ | 18.00 | 17.00 | 28.00 | 16.00 | 14.00 | 20.00 |
| CaO | 12.00 | 12.00 | 9.00 | 21.00 | 6.00 | 15.00 |
| MgO | 4.00 | 2.00 | 4.00 | 2.00 | 15.00 | 3.00 |
| SrO | 1.30 | 1.30 | 1.50 | 0.90 | 1.50 | 0.40 |
| $SnO_2$ | — | — | 0.50 | 0.70 | 0.30 | 0.60 |
| BaO | — | — | — | — | — | — |
| Melting temperature (□) | 1470 | 1450 | 1500 | 1550 | 1600 | 1400 |

TABLE 1-continued

| M value | 5.34 | −35.32 | 75.23 | 7.43 | 8.58 | 5.80 |
|---|---|---|---|---|---|---|
| Glass substrate thickness D (mm) | 0.21 | 0.35 | 0.30 | 0.45 | 0.40 | 0.35 |
| Glass substrate thickness range H (μm) | 22.00 | 28.00 | 30.00 | 35.00 | 29.00 | 29.00 |
| Number of solid inclusions and gas inclusions N (per Kg of glass) | 0.43 | 0.50 | 0.52 | 0.55 | 0.50 | 0.62 |
| Warpage (mm) | 0.028 | 0.082 | 0.075 | 0.072 | 0.058 | 0.052 |

* "—"means absent

Different melting temperatures and parts by weight of the components were used in Examples 1-7 and Comparative Examples 1-5. The glass substrates of Examples 1-7 comprising the components $SiO_2$, $Al_2O_3$, $B_2O_3$, CaO, MgO, and SrO in amounts falling within the ranges of parts by weight as defined in the present invention had M values of 5.49, 2.56, 6.17, 7.68, 6.10, 6.10 and 5.34, respectively, in which Examples 1 and 7 did not comprise $SnO_2$ and BaO, Examples 2-5 further comprised $SnO_2$, and Example 6 further comprised $SnO_2$ and BaO. However, the glass substrates of Comparative Examples 1-5 comprising the components $SiO_2$, $Al_2O_3$, $B_2O_3$, CaO, MgO and SrO in amounts not falling within the ranges of parts by weight as defined in the present invention had M values of −35.3, 75.23, 7.42, 8.58, and 5.80, respectively, in which the M values of Comparative Examples 3-5 fell within the range as defined in the present invention, but the contents of CaO, MgO and SrO did not fall within the ranges as defined in the present invention. The glass substrates of Comparative Examples 1-5 had more solid inclusions and gas inclusions, and greater thickness range and warpage. The glass substrates of Examples 1-7 had less solid inclusions and gas inclusions, and smaller thickness range and warpage than Comparative Examples 1-5.

For the glass substrates of Examples 1-7, the length-width ratios of 1.18, 1.2, 1.24, 1.16, 1.13, 1.24 and 1.24 falling within the range as defined in the present invention were respectively selected (if the length-width ratio of the original sheet is not within the range of 1.02 to 1.24 as defined in the present invention, then the sheet should be cut into a value in this range) to calculate the K values. The results are shown in Table 2. The M value, the thickness of the glass substrate D (mm), the thickness range of the glass substrate H (μm), and the number of solid inclusions and gas inclusions N (per Kg of glass) of Examples 1-7 in Table 2 come from corresponding data in Table 1.

As can be seen from Table 2, the M values of the glass substrates of Examples 1-7 all fall within the range as defined in the present invention. The K values of the glass substrates of Examples 1-5 are all less than 7 (4.53, 4.61, 4.23, 4.84, and 5.11, respectively), all falling within the range as defined in the present invention. The K values of the glass substrates of Examples 6 and 7 are both greater than 7 (7.01 and 7.10, respectively), not falling within the range as defined in the present invention. In other words, the M values and the K values of the glass substrates of Examples 1-5 all fall within the ranges as defined in the present invention; and the M values of the glass substrates of Examples 6 and 7 fall within the range as defined in the present invention, but the K values do not fall within the range as defined in the present invention.

Examples 8-11

Effects of Presence of Sonication and Rods

The same composition, contents, and melting temperature as in Example 1 and Comparative Example 1 were used to investigate the effects of sonication and rods on the number of solid inclusions and gas inclusions, thickness range, and warpage of the glass substrate.

The components, contents and melting temperature in Examples 8 and 9 are the same as those in Example 1; and the components, contents and melting temperature in Examples 10 and 11 are the same as those in Comparative Example 1.

TABLE 2

|  | Example 1 | Example 2 | Example 3 | Example 4 | Example 5 | Example 6 | Example 7 |
|---|---|---|---|---|---|---|---|
| M value | 5.49 | 2.56 | 6.17 | 7.68 | 6.10 | 6.10 | 5.34 |
| Length-width ratio (X/Y) | 1.18 | 1.2 | 1.24 | 1.16 | 1.13 | 1.24 | 1.24 |
| Glass substrate thickness D (mm) | 0.35 | 0.45 | 0.50 | 0.35 | 0.30 | 0.26 | 0.21 |
| Glass substrate thickness range H (μm) | 14.00 | 15.00 | 13.00 | 15.00 | 16.00 | 22.00 | 22.00 |
| Number of solid inclusions and gas inclusions N (per Kg of glass) | 0.17 | 0.18 | 0.23 | 0.24 | 0.24 | 0.43 | 0.43 |
| K value | 4.53 | 4.61 | 4.23 | 4.84 | 5.11 | 7.01 | 7.10 |

TABLE 3

|  | Example 1 | Example 8 | Example 9 | Comparative Example 1 | Example 10 | Example 11 |
|---|---|---|---|---|---|---|
| Glass substrate thickness range (μm) | 14.00 | 11.00 | 9.00 | 28.00 | 27.00 | 25.00 |
| Number of solid inclusions and gas inclusions (per Kg of glass) | 0.17 | 0.12 | 0.10 | 0.50 | 0.47 | 0.43 |
| warpage (mm) | 0.012 | 0.009 | 0.007 | 0.082 | 0.079 | 0.076 |
| Acoustic energy density/frequency/ single operating time of sonication | No | 55 W/L/ 30 kHz/ 15 min | 55 W/L/ 30 kHz/ 15 min | No | 57 W/L/ 40 kHz/ 12 min | 57 W/L/ 40 kHz/ 12 min |
| Number of times/time interval (min) |  | twice/5 min | twice/5 min |  | twice/5 min | twice/5 min |
| Rods | No | No | Yes | No | No | Yes |

* Examples 8-11 comprise sonication at a temperature of 1200 degrees Celsius in both steps 1) and 2). Examples 9 and 11 have rods inserted during the sonication of both steps 1) and 2). The rods inserted during the sonication are 16 cylinders of 15 mm in diameter, which are made from Pt, and arranged in an array, with a spacing of 10 mm between each other. The data in Table 1 are used for Example 1 and Comparative Example 1 in Table 3.

As can be seen from Table 3, as compared to the glass substrate of Example 1 having an M value falling within the range as defined in the present invention (with an M value of 5.49), the glass substrate obtained after the sonication operation in Example 8 has better performances in terms of the number of solid inclusions and gas inclusions, the thickness range, and the warpage. After further operation of inserting the rods arranged in an array in Example 9, the number of solid inclusions and gas inclusions, the thickness range, and the warpage of the resulting glass substrate are further improved.

Similarly, as compared to the glass substrate of Comparative Example 1 having an M value not falling within the range as defined in the present invention (with an M value of −35.3), the glass substrate obtained after the sonication operation in Example 10 has better performances in terms of the number of solid inclusions and gas inclusions, the thickness range, and the warpage. After further operation of inserting the rods arranged in an array in Example 11, the number of solid inclusions and gas inclusions, the thickness range, and the warpage of the resulting glass substrate are further improved.

Testing of Fracture Toughness

The fracture toughness ($K_{IC}$) values of the glass substrates of Examples 1-7 were measured in MPa·M$^{1/2}$ in accordance with ASTM E-1820 using a universal tester and a Vickers hardness tester. The results are shown in Table 4. The data in Table 2 are used for the M values and K values in Table 4.

As can be seen from Table 4, the fracture toughness values of the glass substrates of Examples 1-5 are relatively high (0.97, 0.98, 0.96, 0.91 and 0.88, respectively). However, the fracture toughness values of the glass substrates of Examples 6-7 are relatively low (0.62 and 0.65, respectively). That is, the glass substrates of Examples 1-5 are products having better fracture toughness than the glass substrates of Examples 6-7.

As described above, the M values and the K values of the glass substrates of Examples 1-5 all fall within the ranges as defined in the present invention; and the M values of the glass substrates of Examples 6 and 7 fall within the range as defined in the present invention, but the K values do not fall within the range as defined in the present invention.

Therefore, the glass substrate, both the M value and the K value of which fall within the ranges as defined in the present invention, is a product having better performances as described in the present invention; and the glass substrate, the M value of which falls within the range as defined in the present invention, but the K value of which does not fall into the range as defined in the present invention, is a product with relatively inferior performances as described in the present invention.

EQUIVALENTS

The foregoing examples are merely illustrative of the present invention and should not be construed as limiting the scope of the present invention. It is obvious that many modifications and variations can be made to the contents described in the above detailed description and examples of the present invention, without departing from the principles

TABLE 4

|  | Example 1 | Example 2 | Example 3 | Example 4 | Example 5 | Example 6 | Example 7 |
|---|---|---|---|---|---|---|---|
| M value | 5.49 | 2.56 | 6.17 | 7.68 | 6.10 | 6.10 | 5.34 |
| K value | 4.53 | 4.61 | 4.23 | 4.84 | 5.11 | 7.01 | 7.10 |
| Fracture toughness (MPa · m$^{1/2}$) | 0.97 | 0.98 | 0.96 | 0.91 | 0.88 | 0.62 | 0.65 |

What is claimed is:

1. A composition for preparing a glass article, the composition consisting of:
SiO$_2$, Al$_2$O$_3$, B$_2$O$_3$, CaO, MgQ SrO, SnO$_2$ and optionally BaO,
wherein:
relative to about 100 parts by weight of SiO$_2$, a content of Al$_2$O$_3$ is from about 20 to about 35 parts by weight, a content of B$_2$O$_3$ is from about 10 to about 22 parts by weight, a content of CaO is from about 4 to about 17 parts by weight, a content of MgO is from about 0 to about 10 parts by weight, a content of SrO is from about 0.8 to about 14 parts by weight, a content of SnO$_2$ is from about 0.1 to about 0.8 parts by weight, and a content of BaO is from about 0 to about 4 parts by weight; and
the composition has an M value of from about 1 to about 3 as calculated by the following empirical equation (I):

$$M=0.13\times wt(B_2O_3)\times wt(B_2O_3)+0.42\times wt(CaO)+0.55\times wt(MgO)+0.75\times wt(SrO)-0.05\times wt(Al_2O_3)\times wt(Al_2O_3) \quad \text{Equation (I)}$$

wherein:
wt (B$_2$O$_3$) represents parts by weight of B$_2$O$_3$ relative to about 100 parts by weight of SiO$_2$,
wt (CaO) represents parts by weight of CaO relative to about 100 parts by weight of SiO$_2$,
wt (MgO) represents parts by weight of MgO relative to about 100 parts by weight of SiO$_2$,
wt (SrO) represents parts by weight of SrO relative to about 100 parts by weight of SiO$_2$, and
wt (Al$_2$O$_3$) represents parts by weight of Al$_2$O$_3$ relative to about 100 parts by weight of SiO$_2$.

2. The composition of claim 1, wherein the M value is from about 2.56 to about 3.

3. The composition of claim 1, wherein one or more of the content of Al$_2$O$_3$, the content of B$_2$O$_3$, the content of CaO, the content of MgO, and the content of SrO are independently defined as follows:
the content of Al$_2$O$_3$ is from about 25 to about 30 parts by weight;
the content of B$_2$O$_3$ is from about 15 to about 18 parts by weight;
the content of CaO is from about 10 to about 14 parts by weight;
the content of MgO is from about 1 to about 5 parts by weight; or
the content of SrO is from about 1.1 to about 1.5 parts by weight.

4. The composition of claim 1, wherein one or more of the content of SnO$_2$ and the content of BaO are independently defined as follows:
the content of SnO$_2$ is from about 0.2 to about 0.7 parts by weight; or
the content of BaO is from about 0.5 to about 3 parts by weight.

5. A glass article manufactured from the composition of claim 1.

6. The glass article of claim 5, which is a glass substrate, wherein the glass substrate has a K value of less than or equal to about 7.0 as calculated by the empirical equation (II) below, $$K=1.5\times(X/Y)-1.8\times D+0.22\times H+1.8\times N \quad \text{Equation (II)}$$

wherein:
X/Y represents a length-width ratio of the glass substrate having a value of 1.02 to 1.24,
D represents a numerical value of a thickness of the glass substrate in millimeters (mm),
H represents a numerical value of a thickness range of the glass substrate in micrometers (μm), and
N represents a value indicating a total number of solid inclusions and gas inclusions expressed in number per kilogram (Kg) of the glass substrate.

7. The glass article of claim 6, wherein the K value is less than or equal to about 6.5.

8. The glass article of claim 6, wherein the glass article is manufactured by a method comprising:
1) preparing the components in the form of raw materials into a clear glass melt by a process comprising melting;
2) homogenizing the clear glass melt to obtain a homogenized clear glass melt; and
3) cooling and molding the homogenized clear glass melt, wherein either or both of step 1) and step 2) comprise sonication; and optionally, one or more rods are inserted into the clear glass melt during the sonication.

9. The glass article of claim 8, wherein
the sonication is carried out using an ultrasonic wave having an average acoustic energy density of from about 50 to about 60 W/L; and/or
the sonication is carried out using an ultrasonic wave having an ultrasonic frequency of from about 25 to about 40 kHz.

10. The glass article of claim 8, wherein the sonication is carried out at a temperature of from about 1000 to about 1500° C.

11. The glass article of claim 8, wherein a duration of the sonication is independently from about 3 to about 60 minutes.

12. The glass article of claim 8, wherein when multiple sonications are used, the time interval between each of the sonications is independently from 1 to 20 minutes.

13. The glass article of claim 8, wherein the rod is a cylinder and/or a prism.

14. The glass article of claim 8, wherein the rod is made from an inert material not imparting impurities to the glass melt.

15. The glass article of claim 8, wherein the spacing among the plurality of rods is independently from about 10 to about 50 mm.

16. A glass article, consisting of:
SiO$_2$, Al$_2$O$_3$, B$_2$O$_3$, CaO, MgO SrO, SnO$_2$ and optionally BaO,
wherein:
relative to about 100 parts by weight of SiO$_2$, a content of Al$_2$O$_3$ is from about 20 to about 35 parts by weight, a content of B$_2$O$_3$ is from about 10 to about 22 parts by weight, a content of CaO is from about 4 to about 17 parts by weight, a content of MgO is from about 0 to about 10 parts by weight, a content of SrO is from about 0.8 to about 14 parts by weight, a content of SnO$_2$ is from about 0.1 to about 0.8 parts by weight, and a content of BaO is from about 0 to about 4 parts by weight; and
the glass article has an M value of from about 1 to about 3 as calculated by the following empirical equation (I):

$$M=0.13\times wt(B_2O_3)\times wt(B_2O_3)+0.42\times wt(CaO)+0.55\times wt(MgO)+0.75\times wt(SrO)-0.05\times wt(Al_2O_3)\times wt(Al_2O_3) \quad \text{Equation (I)}$$

wherein:
wt (8203) represents parts by weight of $B_2O_3$ relative to about 100 parts by weight of $SiO_2$,
wt (CaO) represents parts by weight of CaO relative to about 100 parts by weight of $SiO_2$,
wt (MgO) represents parts by weight of MgO relative to about 100 parts by weight of $SiO_2$,
wt (SrO) represents parts by weight of SrO relative to about 100 parts by weight of $SiO_2$, and
wt ($Al_2O_3$) represents parts by weight of $Al_2O_3$ relative to about 100 parts by weight of $SiO_2$.

17. The glass article of claim 16, wherein the M value is from about 2.56 to about 3.

18. The glass article of claim 16, wherein one or more of the content of $Al_2O_3$, the content of $B_2O_3$, the content of CaO, the content of MgO, and the content of SrO are independently defined as follows:
the content of $Al_2O_3$ is from about 25 to about 30 parts by weight;
the content of $B_2O_3$ is from about 15 to about 18 parts by weight;
the content of CaO is from about 10 to about 14 parts by weight;
the content of MgO is from about 1 to about 5 parts by weight; or
the content of SrO is from about 1.1 to about 1.5 parts by weight.

19. The glass article of claim 16, wherein one or more of the content of $SnO_2$ and the content of BaO are independently defined as follows:
the content of $SnO_2$ is from about 0.2 to about 0.7 parts by weight; or
the content of BaO is from about 0.5 to about 3 parts by weight.

20. The glass article of claim 16, wherein the glass substrate has a K value of less than or equal to about 7.0 as calculated by the empirical equation (II) below, $$K = 1.5 \times (X/Y) - 1.8 \times D + 0.22 \times H + 1.8 \times N \quad \text{Equation (II)}$$

wherein
X/Y represents the length-width ratio of the glass substrate having a value of 1.02 to 1.24,
D represents a numerical value of the thickness of the glass substrate in millimeters (mm),
H represents a numerical value of the thickness range of the glass substrate in micrometers (μm), and
N represents a value indicating the total number of solid inclusions and gas inclusions expressed in number per kilogram (Kg) of the glass substrate.

21. The glass article of claim 20, wherein the K value is less than or equal to about 6.5.

22. The glass article of claim 20, wherein the glass article is manufactured by a method comprising:
1) preparing the components in the form of raw materials into a clear glass melt by a process comprising melting;
2) homogenizing the clear glass melt to obtain a homogenized clear glass melt; and
3) cooling and molding the homogenized clear glass melt, wherein either or both of step 1) and step 2) comprise sonication; and optionally, one or more rods are inserted into the clear glass melt during the sonication.

23. The glass article of claim 22, wherein the sonication is carried out using an ultrasonic wave having an average acoustic energy density of from about 50 to about 60 W/L; and/or the sonication is carried out using an ultrasonic wave having an ultrasonic frequency of from about 25 to about 40 kHz.

24. The glass article of claim 22, wherein the sonication is carried out at a temperature of from about 1000 to about 1500° C.

25. The glass article of claim 22, wherein a duration of the sonication is independently from about 3 to about 60 minutes.

26. The glass article of claim 22, wherein when multiple sonications are used, the time interval between each of the sonications is independently from 1 to 20 minutes.

27. The glass article of claim 22, wherein the rod is a cylinder and/or a prism.

28. The glass article of claim 22, wherein the rod is made from an inert material not imparting impurities to the glass melt.

29. The glass article of claim 22, wherein the spacing among the plurality of rods is independently from about 10 to about 50 mm.

30. A display device, comprising the glass article of claim 5.

31. The display device of claim 30, wherein the display device is selected from the group consisting of a display screen, a television, a touch screen, a flat panel display device, a portable display device, and a communication device.

* * * * *